US009232550B2

(12) United States Patent
Gao et al.

(10) Patent No.: US 9,232,550 B2
(45) Date of Patent: Jan. 5, 2016

(54) METHOD AND APPARATUS FOR FACILITATING DEVICE-TO-DEVICE COMMUNICATION

(75) Inventors: Chunyan Gao, Beijing (CN); Haiming Wang, Beijing (CN); Gilles Charbit, Farnborough (GB)

(73) Assignee: BROADCOM CORPORATION, Irvine, CA (US)

( * ) Notice: Subject to any disclaimer, the term of this patent is extended or adjusted under 35 U.S.C. 154(b) by 74 days.

(21) Appl. No.: 14/007,268

(22) PCT Filed: Mar. 31, 2011

(86) PCT No.: PCT/CN2011/072339
§ 371 (c)(1),
(2), (4) Date: Sep. 24, 2013

(87) PCT Pub. No.: WO2012/129806
PCT Pub. Date: Oct. 4, 2012

(65) Prior Publication Data
US 2014/0018010 A1    Jan. 16, 2014

(51) Int. Cl.
*H04W 76/02* (2009.01)
*H04W 40/12* (2009.01)
*H04W 72/08* (2009.01)

(52) U.S. Cl.
CPC .......... *H04W 76/023* (2013.01); *H04W 72/085* (2013.01)

(58) Field of Classification Search
CPC . H04W 76/02; H04W 76/023; H04W 72/085; H04W 28/0231; H04W 40/12; H04W 72/1226
See application file for complete search history.

(56) References Cited

U.S. PATENT DOCUMENTS

| 2008/0056174 A1* | 3/2008 | Jung et al. ............... 370/315 |
| 2008/0220790 A1 | 9/2008 | Cai et al. |
| 2009/0323700 A1 | 12/2009 | Schwan et al. |

(Continued)

FOREIGN PATENT DOCUMENTS

| CN | 101415243 A | 4/2009 |
| CN | 101616089 A | 12/2009 |
| CN | 101657982 A | 2/2010 |

(Continued)

OTHER PUBLICATIONS

International Search Report and Written Opinion for Application No. PCT/CN2011/072339; dated Jan. 5, 2012.

*Primary Examiner* — Andrew Wendell
(74) *Attorney, Agent, or Firm* — Oblon, McClelland, Maier & Neustadt, L.L.P.

(57) ABSTRACT

A method is provided for facilitating device-to-device communication. The method may include causing a message to be sent to a first device to trigger the first device to transmit a reference signal. The method may further include causing a request for a channel quality indication to be sent to a second device. The request may indicate that the channel quality indication is to be based on measurement of the reference signal. The method may additionally include receiving the channel quality indication in response to the request. The channel quality indication being indicative of a link quality between the first device and the second device. The method made also include determining based on the received channel quality indication whether to cause establishment of a device-to-device link between the first device. A corresponding apparatus and computer program product are also provided.

19 Claims, 10 Drawing Sheets

(56) References Cited

U.S. PATENT DOCUMENTS

2009/0325625 A1 12/2009 Hugl et al.
2010/0136997 A1* 6/2010 Palanki et al. ............. 455/452.1
2013/0208710 A1* 8/2013 Seo et al. ...................... 370/336

FOREIGN PATENT DOCUMENTS

| CN | 101772113 A | 7/2010 |
| WO | WO-2007/019340 A2 | 2/2007 |
| WO | WO-2010/108549 A1 | 9/2010 |

* cited by examiner

METHOD AND APPARATUS FOR FACILITATING DEVICE-TO-DEVICE COMMUNICATION

TECHNOLOGICAL FIELD

Embodiments of the present invention relate generally to wireless communication technology and, more particularly, relate to an apparatus, method and computer program product for facilitating device-to-device communication.

BACKGROUND

The modern communications era has brought about a tremendous expansion of wireless network technology, driven by consumer demands. This expansion of wireless and mobile networking technologies have addressed related consumer demands, while providing more flexibility and immediacy of information transfer and providing convenience to users.

Current and future networking technologies continue to facilitate ease of information transfer and convenience to users. In order to provide easier or faster information transfer and convenience, telecommunication industry service providers are developing improvements to existing networks. One ongoing area of development in networking and communication technology is the development of device-to-device (D2D) communication technologies. D2D communication technologies may use radio resources of a hosting cellular system, but allow two computing devices, such as mobile terminals (also referred to as user equipment (UE)), to communicate directly with each other without routing their communications through components of the cellular system.

Use of D2D communication may offer several advantages. For example, the direct communication link between mobile terminals engaged in D2D communication may result in reduced end-to-end delay time for data exchanged between the terminals as compared to indirect communication via cellular system components. Further, since communications may be offloaded from the cellular network to D2D communication links, network load may be reduced. Additional benefits of D2D communication may include improved local area coverage, improved serving network resource efficiency, and conservation of transmission power by both UEs and network access points. Additionally, D2D communication may support a variety of end user services, such as peer-to-peer applications, head-to-head gaming applications, collaborative applications, and/or the like that may be used by users of mobile terminals within close proximity of each other.

BRIEF SUMMARY OF EXAMPLE EMBODIMENTS

Methods, apparatuses and computer program products are provided herein for facilitating device-to-device communication. Embodiments provided herein may provide several advantages to network providers, network access points, mobile computing devices, and computing device users. For example, some example embodiments may facilitate mode selection by a network access point by providing for measurement and reporting of device-to-device link quality with relatively limited signaling complexity. Some example embodiments may further facilitate link adaptation of an established D2D link by providing for measurement and reporting to aid resource allocation without imposing a significant signaling overhead. Further, while example embodiments may be applied to any networking technology or system, some example embodiments may be particularly beneficial for Long Term Evolution (LTE) cellular networks by facilitating D2D communication in LTE systems without significantly impacting the specification and implementation of LTE systems.

In a first example embodiment, a method is provided, which may comprise causing a message to be sent to a first device to trigger the first device to transmit a reference signal. The method of this example embodiment may further comprise causing a request for a channel quality indication to be sent to a second device. The request of this example embodiment may indicate that the channel quality indication is to be based on measurement of the reference signal. The method of this example embodiment may additionally comprise receiving the channel quality indication in response to the request. The channel quality indication of this example embodiment may be indicative of a link quality between the first device and the second device. The method of this example embodiment may also comprise determining based at least in part on the received channel quality indication whether to cause establishment of a device-to-device link between the first device and the second device or to cause service for communication between the first device and the second device to be provided via a network mode.

In a second example embodiment, an apparatus comprising processing circuitry is provided. The processing circuitry of this example embodiment may be configured to at least cause a message to be sent to a first device to trigger the first device to transmit a reference signal, The processing circuitry of this example embodiment may be further configured to cause a request for a channel quality indication to be sent to a second device. The request of this example embodiment may indicate that the channel quality indication is to be based on measurement of the reference signal. The processing circuitry of this example embodiment may be additionally configured to receive the channel quality indication in response to the request. The channel quality indication of this example embodiment may be indicative of a link quality between the first device and the second device. The processing circuitry of this example embodiment may be also configured to determine based at least in part on the received channel quality indication whether to cause establishment of a device-to-device link between the first device and the second device or to cause service for communication between the first device and the second device to be provided via a network mode.

In a third example embodiment, a computer program product comprising at least one computer-readable storage medium having computer-readable program code instructions stored therein is provided. The computer-readable program code instructions may include program code instructions configured to cause an apparatus to perform a method. The method of this example embodiment may comprise causing a message to be sent to a first device to trigger the first device to transmit a reference signal. The method of this example embodiment may further comprise causing a request for a channel quality indication to be sent to a second device. The request of this example embodiment may indicate that the channel quality indication is to be based on measurement of the reference signal. The method of this example embodiment may additionally comprise receiving the channel quality indication in response to the request. The channel quality indication of this example embodiment may be indicative of a link quality between the first device and the second device. The method of this example embodiment may also comprise determining based at least in part on the received channel quality indication whether to cause establishment of a device-to-device link between the first device and the second device or to cause service for communication between the first device and the second device to be provided via a network mode.

In a fourth example embodiment, an apparatus is provided, which may comprise means for causing a message to be sent to a first device to trigger the first device to transmit a reference signal. The apparatus of this example embodiment may further comprise means for causing a request for a channel quality indication to be sent to a second device. The request of this example embodiment may indicate that the channel quality indication is to be based on measurement of the reference signal. The apparatus of this example embodiment may additionally comprise means for receiving the channel quality indication in response to the request. The channel quality indication of this example embodiment may be indicative of a link quality between the first device and the second device. The apparatus of this example embodiment may also comprise means for determining based at least in part on the received channel quality indication whether to cause establishment of a device-to-device link between the first device and the second device or to cause service for communication between the first device and the second device to be provided via a network mode.

In a fifth example embodiment, a method is provided, which may comprise receiving, at a first device, a request for a channel quality indication sent by a network access point. The request of this example embodiment may indicate that the channel quality indication is to be based on measurement of a reference signal. The method of this example embodiment may further comprise receiving, at the first device, the reference signal, which may be transmitted by a second device. The method of this example embodiment may additionally comprise performing, at the first device, a measurement to determine the channel quality indication based at least in part on the reference signal in response to the request. The channel quality indication of this example embodiment may be indicative of a link quality between the first device and the second device. The method of this example embodiment may also comprise causing the determined channel quality indication to be sent from the first device to the network access point.

In a sixth example embodiment, an apparatus comprising processing circuitry is provided. The processing circuitry of this example embodiment may be configured to at least receive a request for a channel quality indication sent by a network access point. The request of this example embodiment may indicate that the channel quality indication is to be based on measurement of a reference signal. The processing circuitry of this example embodiment may be further configured to receive the reference signal, which may be transmitted by a device. The processing circuitry of this example embodiment may additionally be configured to perform a measurement to determine the channel quality indication based at least in part on the reference signal in response to the request. The channel quality indication of this example embodiment may be indicative of a link quality between the apparatus and the device. The processing circuitry of this example embodiment may also be configured to cause the determined channel quality indication to be sent to the network access point.

In a seventh example embodiment, a computer program product comprising at least one computer-readable storage medium having computer-readable program code instructions stored therein is provided. The computer-readable program code instructions may include program code instructions configured to cause an apparatus to perform a method. The method of this example embodiment may comprise receiving, at a first device, a request for a channel quality indication sent by a network access point. The request of this example embodiment may indicate that the channel quality indication is to be based on measurement of a reference signal. The method of this example embodiment may further comprise receiving, at the first device, the reference signal, which may be transmitted by a second device. The method of this example embodiment may additionally comprise performing, at the first device, a measurement to determine the channel quality indication based at least in part on the reference signal in response to the request. The channel quality indication of this example embodiment may be indicative of a link quality between the first device and the second device. The method of this example embodiment may also comprise causing the determined channel quality indication to be sent from the first device to the network access point.

In an eighth example embodiment, an apparatus is provided, which may comprise means for receiving a request for a channel quality indication sent by a network access point. The request of this example embodiment may indicate that the channel quality indication is to be based on measurement of a reference signal. The apparatus of this example embodiment may further comprise means for receiving the reference signal, which may be transmitted by a device. The apparatus of this example embodiment may additionally comprise means for performing a measurement to determine the channel quality indication based at least in part on the reference signal in response to the request. The channel quality indication of this example embodiment may be indicative of a link quality between the apparatus and the device. The apparatus of this example embodiment may also comprise means for causing the determined channel quality indication to be sent to the network access point.

In a ninth example embodiment, a method is provided, which may comprise configuring a device-to-device identifier specific to a device-to-device cluster comprising two or more devices. The identifier of this example embodiment may enable devices in the device-to-device cluster to identify control signaling related to the device-to-device cluster. The method of this example embodiment may further comprise configuring a device-to-device search space specific to the device-to-device cluster. The method of this example embodiment may also comprise causing device-to-device control signaling related to the device-to-device cluster to be sent in the device-to-device search space. At least a portion of the device-to-device control signaling may be scrambled with the device-to-device identifier.

In a tenth example embodiment, an apparatus comprising processing circuitry is provided. The processing circuitry of this example embodiment may be configured to at least configure a device-to-device identifier specific to a device-to-device cluster comprising two or more devices. The identifier of this example embodiment may enable devices in the device-to-device cluster to identify control signaling related to the device-to-device cluster. The processing circuitry of this example embodiment may be further configured to configure a device-to-device search space specific to the device-to-device cluster. The processing circuitry of this example embodiment may also be configured to cause device-to-device control signaling related to the device-to-device cluster to be sent in the device-to-device search space. At least a portion of the device-to-device control signaling may be scrambled with the device-to-device identifier.

In an eleventh example embodiment, a computer program product comprising at least one computer-readable storage medium having computer-readable program code instructions stored therein is provided. The computer-readable program code instructions may include program code instructions configured to cause an apparatus to perform a method. The method of this example embodiment may comprise configuring a device-to-device identifier specific to a device-to-device cluster comprising two or more devices. The identifier of this example embodiment may enable devices in the device-to-device cluster to identify control signaling related to the device-to-device cluster. The method of this example embodiment may further comprise configuring a device-to-device search space specific to the device-to-device cluster. The method of this example embodiment may also comprise causing device-to-device control signaling related to the device-to-device cluster to be sent in the device-to-device search space. At least a portion of the device-to-device control signaling may be scrambled with the device-to-device identifier.

In a twelfth example embodiment, an apparatus is provided, which may comprise means for configuring a device-to-device identifier specific to a device-to-device cluster comprising two or more devices. The identifier of this example embodiment may enable devices in the device-to-device cluster to identify control signaling related to the device-to-device cluster. The apparatus of this example embodiment may further comprise means for configuring a device-to-device search space specific to the device-to-device cluster. The apparatus of this example embodiment may also comprise means for causing device-to-device control signaling related to the device-to-device cluster to be sent in the device-to-device search space. At least a portion of the device-to-device control signaling may be scrambled with the device-to-device identifier.

In a thirteenth example embodiment, a method is provided, which may comprise determining, at a first device, a configuration of a device-to-device identifier specific to a device-to-device cluster comprising the first device and at least one second device. The method of this example embodiment may further comprise determining, at the first device, a configuration of a device-to-device search space specific to the device-to-device cluster. The method of this example embodiment may also comprise receiving, at the first device, device-to-device control signaling related to the device-to-device cluster. The device-to-device control signaling may be sent in the device-to-device search space, and at least a portion of the device-to-device control signaling may be scrambled with the device-to-device identifier.

In a fourteenth example embodiment, an apparatus comprising processing circuitry is provided. The processing circuitry of this example embodiment may be configured to at least determine a configuration of a device-to-device identifier specific to a device-to-device cluster comprising the apparatus and at least one second apparatus. The processing circuitry of this example embodiment may be further configured to determine a configuration of a device-to-device search space specific to the device-to-device cluster. The processing circuitry of this example embodiment may be additionally configured to receive device-to-device control signaling related to the device-to-device cluster. The device-to-device control signaling may be sent in the device-to-device search space, and at least a portion of the device-to-device control signaling may be scrambled with the device-to-device identifier.

In a fifteenth example embodiment, a computer program product comprising at least one computer-readable storage medium having computer-readable program code instructions stored therein is provided. The computer-readable program code instructions may include program code instructions configured to cause an apparatus to perform a method. The method of this example embodiment may comprise determining, at a first device, a configuration of a device-to-device identifier specific to a device-to-device cluster comprising the first device and at least one second device. The method of this example embodiment may further comprise determining, at the first device, a configuration of a device-to-device search space specific to the device-to-device cluster. The method of this example embodiment may also comprise receiving, at the first device, device-to-device control signaling related to the device-to-device cluster. The device-to-device control signaling may be sent in the device-to-device search space, and at least a portion of the device-to-device control signaling may be scrambled with the device-to-device identifier.

In a sixteenth example embodiment, an apparatus is provided, which may comprise means for determining a configuration of a device-to-device identifier specific to a device-to-device cluster comprising the apparatus and at least one second apparatus. The apparatus of this example embodiment may further comprise means for determining a configuration of a device-to-device search space specific to the device-to-device cluster. The apparatus of this example embodiment may also comprise means for receiving device-to-device control signaling related to the device-to-device cluster. The device-to-device control signaling may be sent in the device-to-device search space, and at least a portion of the device-to-device control signaling may be scrambled with the device-to-device identifier.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
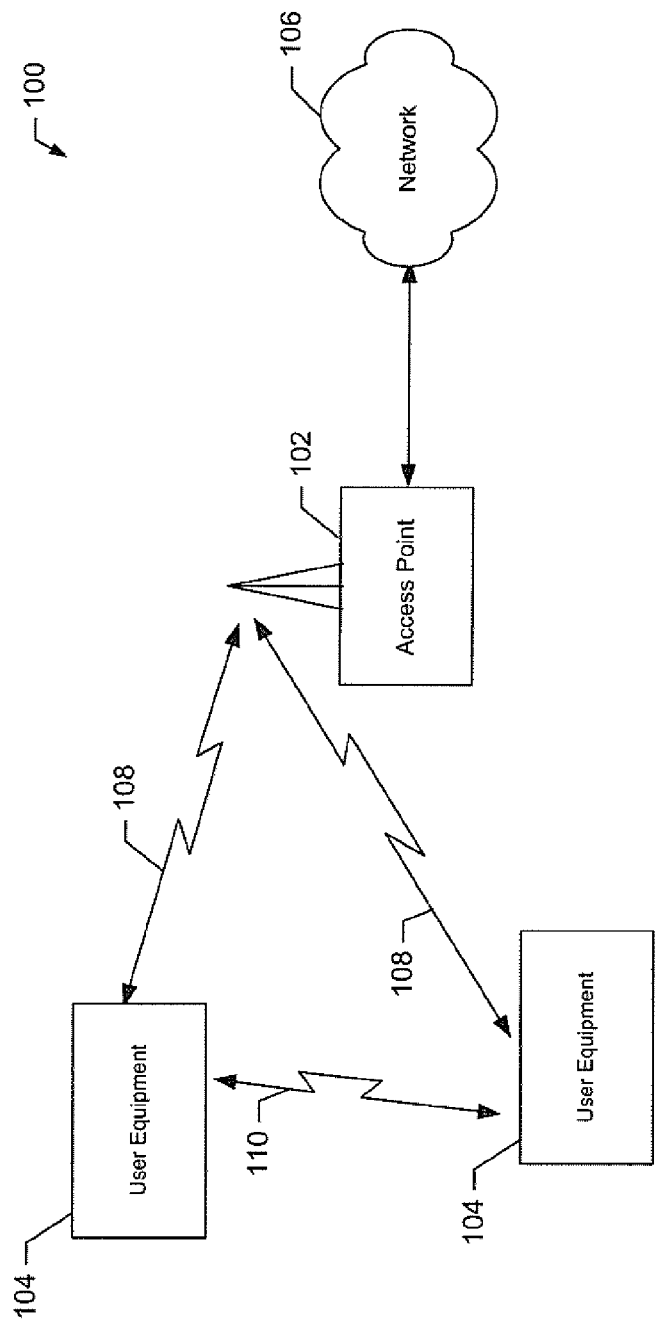
Figure 2:
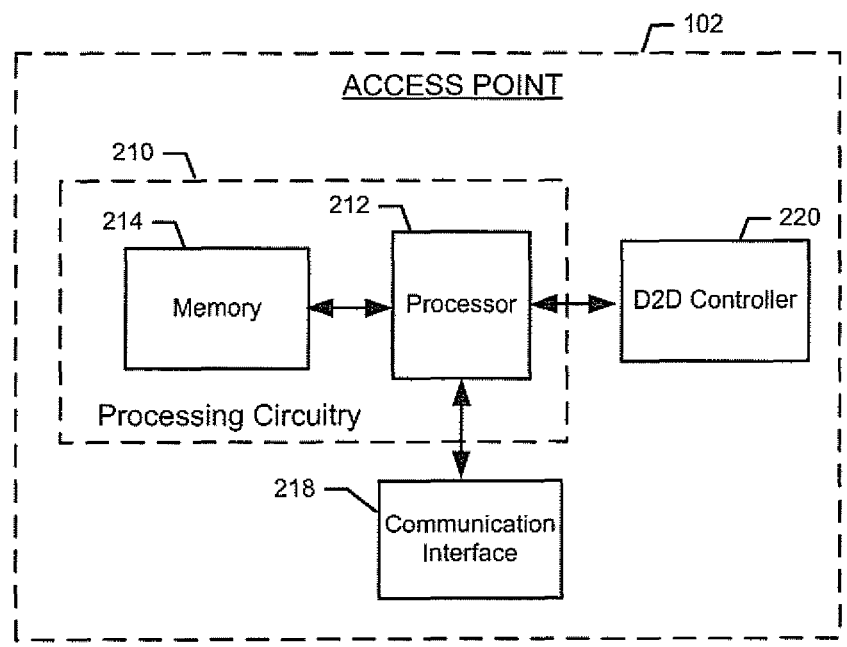
Figure 3:
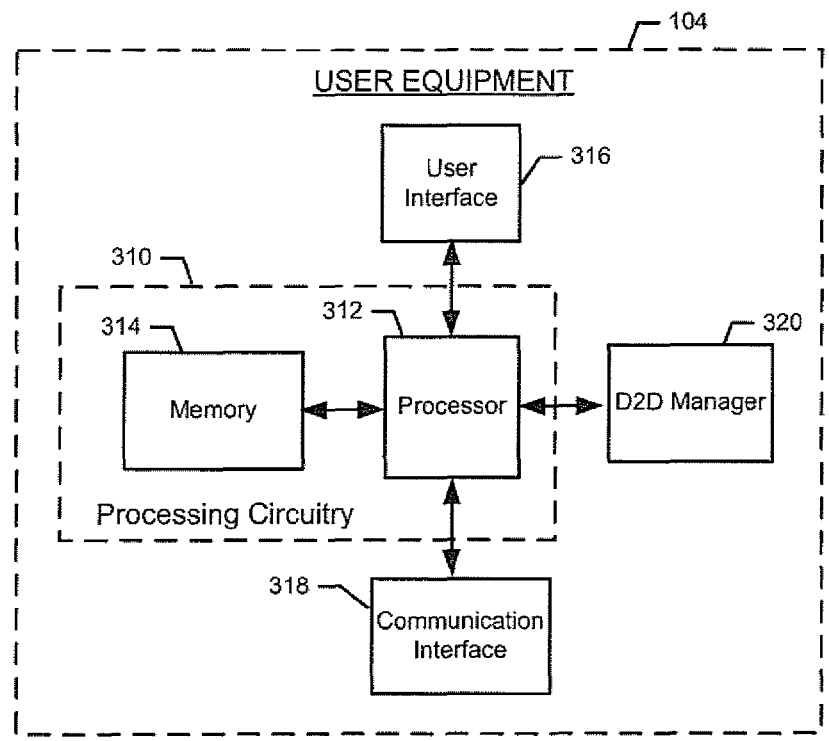
Figure 4:
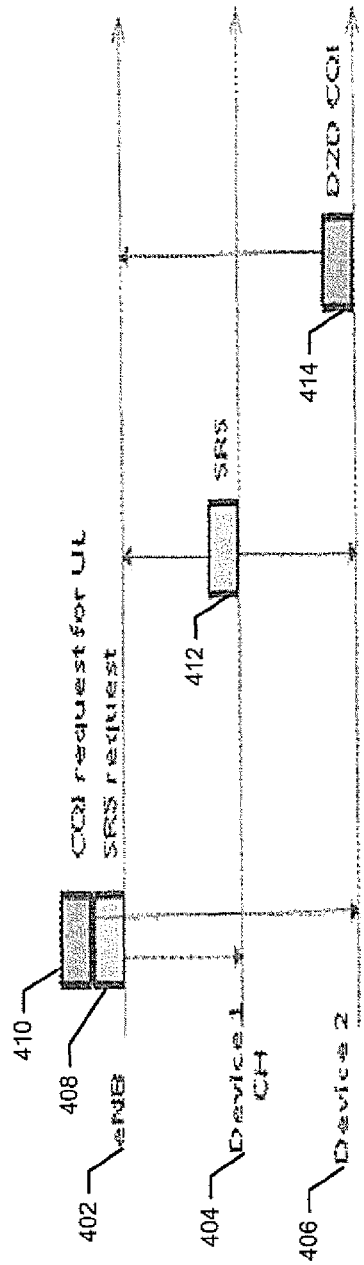
Figure 5:
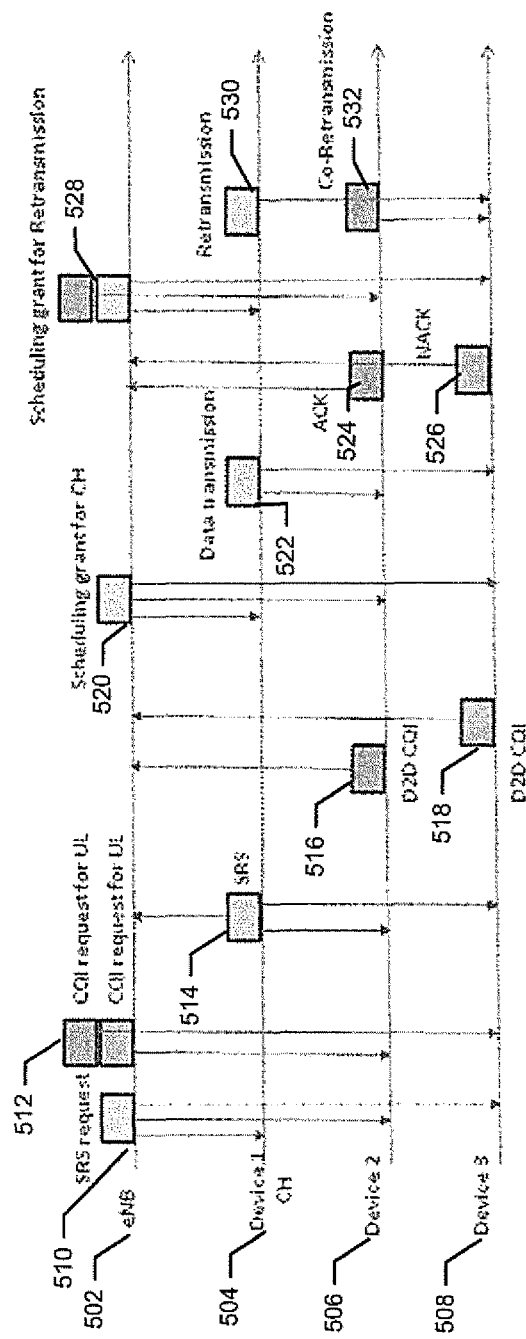
Figure 6:
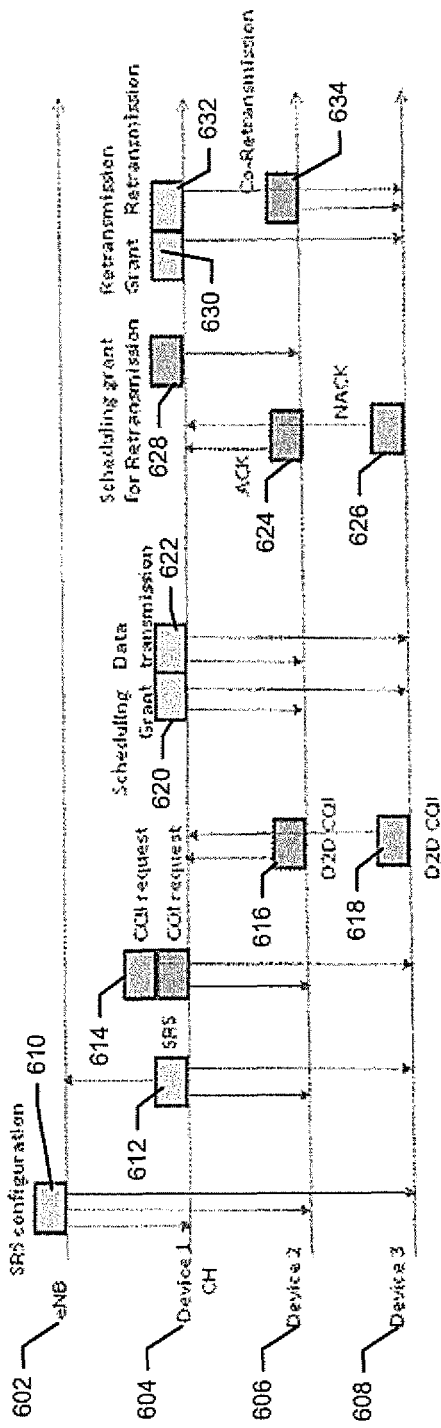
Figure 7:
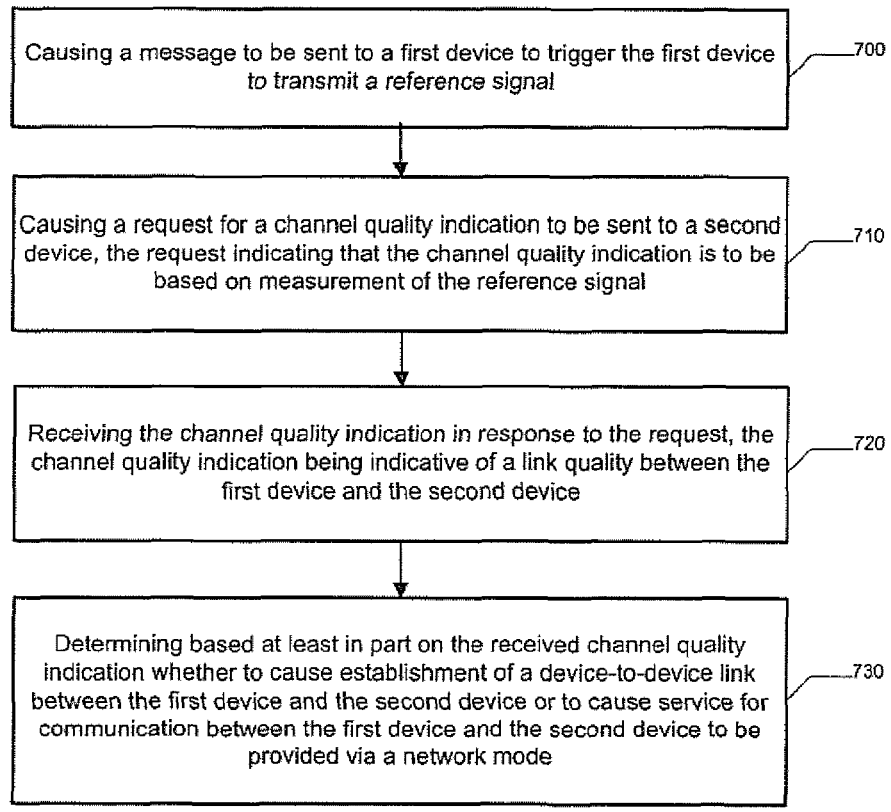
Figure 8:
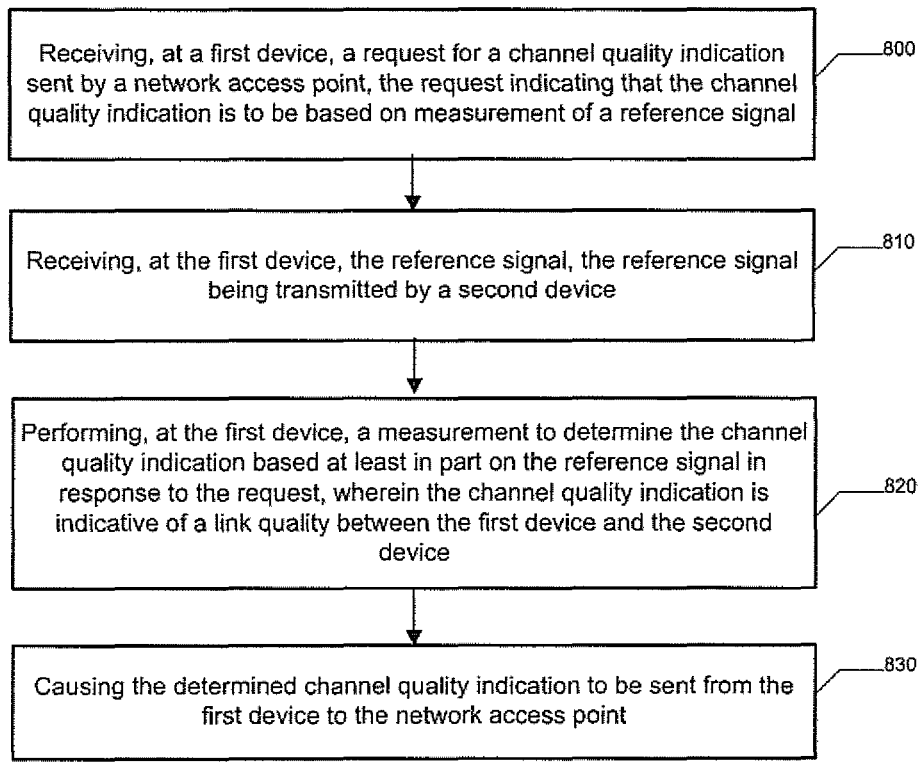
Figure 9:
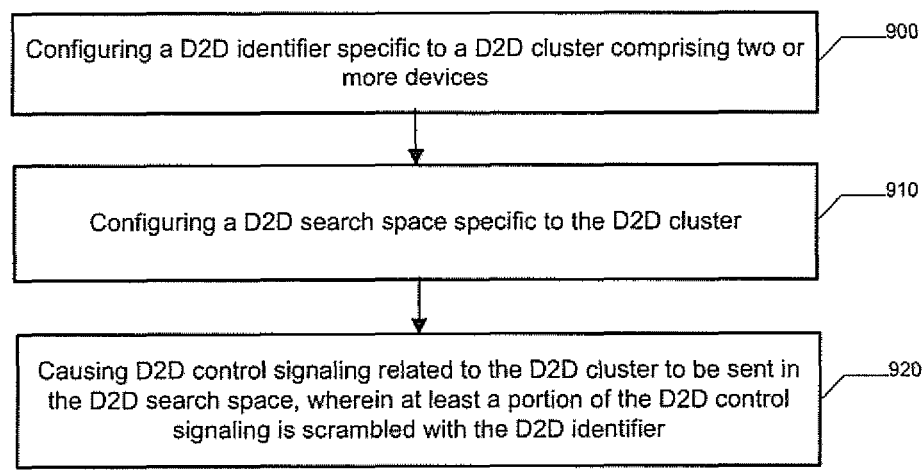
Figure 10:
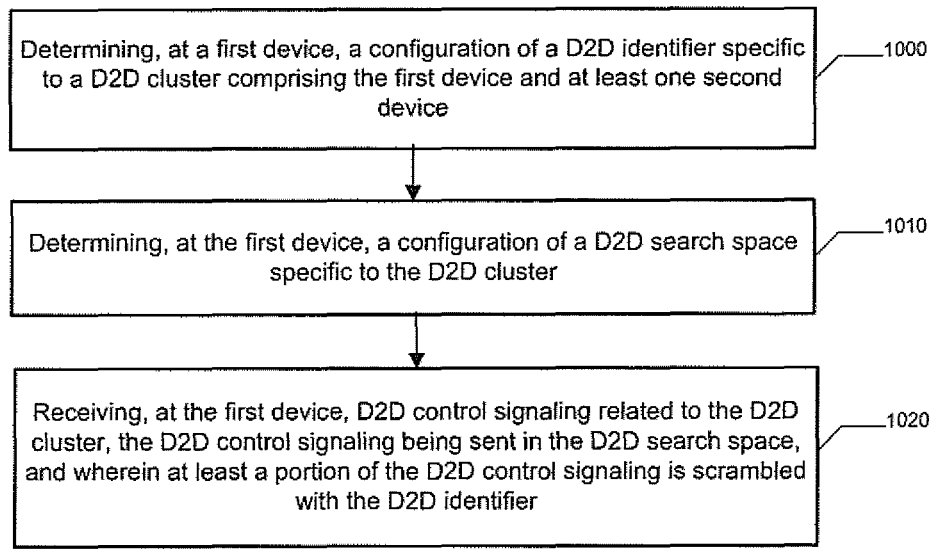

Having thus described embodiments of the invention in general terms, reference will now be made to the accompanying drawings, which are not necessarily drawn to scale, and wherein:

FIG. 1 illustrates an example communication system for facilitating device-to-device communication according to some example embodiments;

FIG. 2 illustrates a block diagram of an access point in accordance with some example embodiments;

FIG. 3 illustrates a block diagram of a user equipment in accordance with some example embodiments;

FIG. 4 illustrates an example signaling diagram of signals that may be exchanged to facilitate device-to-device link setup in accordance with some example embodiments;

FIG. 5 illustrates an example signaling diagram of signals that may be exchanged for facilitating device-to-device communication in accordance with some example embodiments;

FIG. 6 illustrates another example signaling diagram of signals that may be exchanged for facilitating device-to-device communication in accordance with some example embodiments;

FIG. 7 illustrates a flowchart according to an example method for facilitating device-to-device communication setup in accordance with some example embodiments;

FIG. 8 illustrates a flowchart according to another example method for facilitating device-to-device communication setup in accordance with some example embodiments;

FIG. 9 illustrates a flowchart according to an example method for facilitating device-to-device communication according to some example embodiments; and FIG. 10 illustrates a flowchart according to another example method for facilitating device-to-device communication according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Mode selection and link adaptation are two main radio resource management (RRM) functionalities for network access point-controlled D2D operation. With respect to mode selection, the access point may determine whether to setup a D2D communication link for two or more device seeking to communicate or whether to route inter-device communication through the network (e.g., through the access point) in a network mode. The access point may make the, mode selection decision based on any number of factors, including, for example, the link qualities between the respective devices and the access point and the link quality between devices (e.g. the D2D link quality). In a cellular network, the former can be obtained via downlink (DL) measurement and report. However, the latter requires a device to measure the transmission from other device(s), which may raise implementation and signaling complexity issues.

After D2D link setup, the data transmission can be controlled by a device in the D2D cluster configured as the cluster head or by an access point. Regardless of whether the data transmission is controlled by the cluster head or by the access point, control of data transmission may require measurement and report of link quality to allow for resource allocation and link adaptation. Such measurement and report may introduce additional signaling complexity and overhead.

Accordingly, some example embodiments disclosed herein may facilitate D2D communication without requiring significant signaling overhead. Referring now to FIG. 1, a block diagram of an example communication system 100 for facilitating device-to-device communication in accordance with some example embodiments is illustrated. It will be appreciated that the system 100 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a communication system for SSP facilitating device-to-device communication, numerous other configurations may also be used to implement embodiments of the present invention.

The system 100 may include an access point 102 that may provide wireless access to a network 106. The access point 102. By way of example, the access point 102 may comprise a base station, base transceiver station, node B, evolved node B (eNB), and/or the like.

The network 106 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the internet. In some example embodiments, the network 106 may employ one or more mobile access mechanisms, such as Long Term Evolution (LTE), LTE Advanced (LTE-A), Time Division Synchronous Code Division Multiple Access (TD-SCDMA), wideband code division multiple access (W-CDMA), CDMA2000, global system for mobile communications (GSM), general packet radio service (GPRS), and/or the like. As such, it will be appreciated that where embodiments are described herein with respect to LTE and/or LTE-A systems, the use of LTE and/or LTE-A is by way of example and not by way of limitation. In this regard, example embodiments disclosed herein may be employed in accordance with any wireless networking technology, protocol, or standard that is currently implemented, or which may be developed in the future in which D2D communication may be supported through use of one or more example embodiments.

In some example embodiments, the access point 102 may be configured to provide a user equipment (UE) 104 with wireless access to the network 106 via a link 108. The UE 104 may comprise any mobile communication device, such as, a mobile telephone, portable digital assistant (PDA), smart phone, pager, laptop computer, portable game device, or any of numerous other hand held or portable communication devices, computation devices, content generation devices, content consumption devices, or combinations thereof.

The access point 102 may be further configured to support setup of D2D communication between two or more UEs 104. In this regard, the access point 102 may be configured to allocate resources (e.g., in-band resources) for D2D communication, coordinate D2D link setup to accommodate D2D communication between two or more UEs 104, control D2D data transmission by UEs 104 in a D2D cluster, and/or the like.

In the example system illustrated in FIG. 1, two UEs 104 are illustrated, which may engage in D2D communication with each other via a D2D link 110. It will be appreciated, however, that the two illustrated UEs 104 are illustrated by way of example and not by way of limitation. In this regard, it will be appreciated that more than two UEs 104 may engage in D2D communication via one or more D2D links 110.

Two or more UEs 104 engaged in D2D operation over one or more D2D links 110 may comprise a D2D cluster. Accordingly, a D2D cluster may comprise, a D2D pairing between two UEs 104, multiple D2D pairings, three or more UEs 104, engaged in D2D operation over one or more D2D links, or other configuration that may be used for D2D communication between two or more devices. One of the UEs 104 in the D2D cluster may be designated as a cluster head (CH), also referred to as a "master device," which may control some aspects of D2D communication in the cluster following D2D link setup.

FIG. 2 illustrates a schematic block diagram of an access point 102 in accordance with some example embodiments. In this regard, FIG. 2 illustrates an apparatus that may comprise or be employed on an access point 102, and which may be configured to perform at least some of the functionality of an access point 102 as described herein. However, it should be noted that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

Referring now to FIG. 2, the access point 102 may include or otherwise be in communication with processing circuitry 210 that is configurable to perform actions in accordance with example embodiments disclosed herein. The processing circuitry 210 may be configured to perform data processing, application execution and/or other processing and management services according to one or more example embodiments. In some embodiments, the access point 102 or the processing circuitry 210 may be embodied as or comprise a chip or chip set. In other words, the access point 102 or the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The access point 102 or portion thereof, such as the processing circuitry 210, may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a communication interface 218. As such, the processing circuitry 210 may be embodied as a circuit chip (e.g., an integrated circuit chip) configured (e.g., with hardware, software or a combination of hardware and software) to pertain! operations described herein. However, in some embodiments, the processing circuitry 210 may be embodied as a portion of a server, computer, workstation or other computing device.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may enable sending and/or receiving data to and/or from another device over the network 106. As another example, the communication interface 218 may enable sending and/or receiving data to and/or from a UE 104 over a radio interface, such as a link 108. In this regard, the communication interface 218 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In some example embodiments, the memory 214 may include one or more non-transitory memory devices such as, for example, volatile and/or non-volatile memory that may be either fixed or removable. The memory 214 may be configured to store information, data, applications, instructions or the like for enabling the access point 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents or data sets. Among the contents of the memory 214, applications may be stored for execution by the processor 212 in order to carry out the functionality associated with each respective application. In some cases, the memory 214 may be in communication with the processor 212, such as via a bus, for passing information among components of the access point 102.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the processor 212 (or the processing circuitry 210) may be embodied as, include, or otherwise control a D2D controller 220. As such, the D2D controller 220 may be embodied as various means, such as circuitry, hardware, a computer program product comprising computer readable program instructions stored on a computer readable medium (for example, the memory 214) and executed by a processing device (for example, the processor 212), or some combination thereof. The D2D controller 220 may be capable of communication with one or more of the memory 214 or communication interface 218 to access, receive, and/or send data as may be needed to perform one or more of the functionalities of the D2D controller 220 as described herein.

FIG. 3 illustrates a schematic block diagram of a UE 104 in accordance with some example embodiments. In this regard, FIG. 3 illustrates an apparatus that may comprise or be employed on a UE 104, and which may be configured to perform at least some of the functionality of a UE 104 as described herein. However, it should be noted that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

Referring now to FIG. 3, the UE 104 may include or otherwise be in communication with processing circuitry 310 that is configurable to perform actions in accordance with example embodiments disclosed herein. The processing circuitry 310 may be configured to perform data processing, application execution and/or other processing and management services according to one or more example embodiments. In some embodiments, the UE 104 or a portion(s) or component(s) thereof, such as the processing circuitry 310, may be embodied as or comprise a chip or chip set. In other words, the UE 104 or the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The UE 104 or the processing circuitry 310 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 310 may include a processor 312 and, in some embodiments, such as that illustrated in FIG. 3, may further include memory 314. The processing circuitry 310 may be in communication with or otherwise control a user interface 316 and/or a communication interface 318. As such, the processing circuitry 310 may be embodied as a circuit chip (e.g., an integrated circuit chip) configured (e.g., with hardware, software or a combination of hardware and software) to perform operations described herein.

The user interface 316 (if implemented) may be in communication with the processing circuitry 310 to receive an indication of a user input at the user interface 316 and/or to provide an audible, visual, mechanical or other output to the user. As such, the user interface 316 may include, for example, a keyboard, a mouse, a joystick, a display, a touch screen, a microphone, a speaker, and/or other input/output mechanisms.

The communication interface 318 may include one or more interface mechanisms for enabling communication with other devices and/or networks. In some cases, the communication interface 318 may be any means such as a device or circuitry embodied in either hardware, or a combination of hardware and software that is configured to receive and/or transmit data from/to a network and/or any other device or module in communication with the processing circuitry 310. By way of example, the communication interface 318 may be configured to enable radio access of the network 106 by way of the access point 102, such as via a link 108. As another example, the communication interface 318 may support D2D communication with another UE 104, such as via a D2D link 110. In this regard, the communication interface 318 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In some example embodiments, the memory 314 may include one or more non-transitory memory devices such as, for example, volatile and/or non-volatile memory that may be either fixed or removable. The memory 314 may be configured to store information, data, applications, instructions or the like for enabling the UE 104 to carry out various functions in accordance with one or more example embodiments. For example, the memory 314 may be configured to buffer input data for processing by the processor 312. Additionally or alternatively, the memory 314 may be configured to store instructions for execution by the processor 312. As yet another alternative, the memory 314 may include one or more databases that may store a variety of files, contents or data sets. Among the contents of the memory 314, applications may be stored for execution by the processor 312 in order to carry out the functionality associated with each respective application. In some cases, the memory 314 may be in communication with the processor 312 via a bus for passing information among components of the user equipment 302.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform one or more operations described herein.

In some example embodiments, the processor 312 (or the processing circuitry 310) may be embodied as, include, or otherwise control a D2D manager 320. As such, the D2D manager 320 may be embodied as various means, such as circuitry, hardware, a computer program product comprising computer readable program instructions stored on a computer readable medium (for example, the memory 314) and executed by a processing device (for example, the processor 312), or some combination thereof. The D2D manager 320 may be capable of communication with one or more of the memory 314, user interface 316, or communication interface 318 to access, receive, and/or send data as may be needed to perform one or more of the functionalities of the D2D manager 320 as described herein.

In accordance with some example embodiments, measurement to aid D2D link setup and link adaptation may be based on a reference signal, such as a sounding reference signal (SRS) that may be transmitted by a UE 104. While SRS is provided herein for purposes of example when describing some example embodiments, it will be appreciated that other types of signals may be used in addition to or in lieu of SRS as a reference signal for purposes of D2D link setup and adaptation in various example embodiments.

In some example embodiments, one or more SRS parameter sets may be predefined for D2D measurement use to aid the D2D link set up. As an example, an SRS parameter set may be predefined for each UE 104 that may transmit SRS in a D2D cluster. The predefined SRS parameter sets may be known to an access point 102 as well as to UEs 104 to facilitate D2D link setup between two or more UEs 104 under the supervision of an access point 102.

Configuration of an SRS parameter set specific to a given UE 104 may allow flexible configuration of SRS transmissions to account for various link conditions or other circumstances. In this regard, a UE specific SRS parameter set may allow flexibility for transmissions in different subframes with varying subframe offsets. As another example, a UE specific SRS parameter set may facilitate configuration of SRS transmissions in different bandwidths using frequency hopping, such as based on a tree structure. As a further example, a UE specific SRS parameter set may facilitate configuration of SRS transmissions via orthogonality based on cyclic shift and sequence groups within the SRS bandwidth. As still a further example, a UE specific SRS parameter set may facilitate configuration of SRS transmissions via a transmission comb for distributed transmission across SRS bandwidths. In addition, cell-specific SRS configuration may define the subframes that can contain SRS transmissions as well as the SRS bandwidth available in the cell.

In some example embodiments, the D2D controller 220 may be configured to cause the access point 102 to send a request for a channel quality indication to one or more UEs 104. The request may indicate that the channel quality indication is to be based on measurement of a reference signal, such as may be transmitted by a UE 104. The D2D manager 320 associated with a UE 104 may be configured to receive the request and determine based on the contents of the request that the channel quality indication is to be determined based on measurement of a reference signal.

In some example embodiments, the requested channel quality indication may comprise a channel quality indicator (CQI) and the request for the channel quality indication may comprise a CQI request extended to include an additional field, bit, or the like indicating whether the CQI is for downlink (DL) or uplink (UL) subframe. In this regard, if the CQI is for the DL subframe, the CQI may be for normal cellular use. If, however, the CQI is for the UL subframe, the CQI may be intended to be based on measurement of a reference signal for indication of a D2D link quality. In this regard, since a UE 104 may still need to report normal DL CQI for cellular use, such indication may allow the D2D manager 320 associated with a UE 104 receiving such a CQI request to distinguish which type of CQI is requested.

In some example embodiments, when a request for the channel quality indication transmitted by the access point 102 is for the UL subframe, the request may comprise an indication of a timing advance difference between a first UE 104 receiving the request and a second LTE 104, which may be triggered by the access point 102 to transmit a reference signal, based upon which the D2D manager 320 associated with the first UE 104 may determine the channel quality indication. As an example, a CQI request may repurpose a field in Downlink Control Information (DCI) format, such as the transmit power control (TPC) field, to indicate the UL timing difference between the UE 104 transmitting the SRS and the UE(s) 104 measuring the SRS based on device timing advances. In this regard, since respective UEs 104 may be at different distances respectively to the access point 102, such a timing advance indication may be needed to approximately align UL timing receive window at the measuring UE 104 for SRS detection (perfect alignment may only be possible if the respective UEs 104 are in the same Line Of Site (LOS) to the access point 102).

The D2D controller 220 may configure or otherwise trigger reference signal transmission by a UE 104 before D2D link setup. During such period, the D2D manager 320 associated with a UE 104 may monitor an SRS configuration for itself, rather than also monitoring for an SRS configuration for a pairing UE 104.

In response to detecting a request for a channel quality indication for D2D link measurement on the UL subframe, the D2D manager 320 of a UE 104 receiving the request may measure a detected SRS. If a single reference signal parameter set is predefined, the D2D manager 320 may assume the predefined reference signal parameter set and perform the measurement based at least in part on the predefined reference signal parameter set. If, however, there are multiple predefined reference signal parameter sets, the D2D manager 320 may determine which parameter set to use based at least in part on an indication that may be included in the request for the channel quality indication. For example a field, such as the TPC field of a scheduling grant (e.g., DCI 0/4) containing a CQI request may be used as an indication of the SRS parameter set to be used for D2D link measurements. The D2D manager 330 may report a measured channel quality indication to the access point 102. The report may, for example, be in accordance with a predefined CQI report format that may be understood by the D2D controller 220. The report format may be unique to a CQI for D2D measurements on UL subframe, and, as such, may be different from that of DL CQI.

Referring now to FIG. 4, FIG. 4 illustrates an example signaling diagram of signals that may be exchanged to facilitate device-to-device link setup in accordance with some example embodiments. In this regard, FIG. 4 illustrates signaling that may occur between an evolved Node B (eNB) 402, a device 404, referred to in this example as "device 1," and a device 406, referred to in this example as "device 2" to support setup of a D2D link between device 1 and device 2. The eNB 402 may comprise an embodiment of the access point 102. Device 1 and device 2 may each respectively comprise an embodiment of the UE 104.

When device 1 asks for a service relating to device 2 (e.g., sending data to device 2), the eNB 402 may determine whether power and resources may be saved by supporting the service via D2D communication instead of using a network mode routing communication over the cellular network via the eNB 402. At operation 408, the eNB 402 may trigger SRS transmission from device 1. The SRS may be sent, at operation 412, with a predefined parameter. Transmission of the SRS by device 1 may, for example, be controlled by a D2D manager 320 associated with the device 1. At operation 410, the eNB 402 may trigger device 2 to report the aperiodic CQI for the UL subframe. In this regard, a D2D controller 220 associated with the eNB 402 may cause the eNB 402 to send an extended CQI request indicating that the request is to report aperiodic CQI for the UL subframe to device 2.

The D2D manager 320 associated with the device 2 may receive the CQI request and may determine based on the contents of the request that the request is for the UL subframe. The D2D manager 320 associated with device 2 may further determine the appropriate predefined D2D SRS parameter to use. If there is only one predefined D2D SRS parameter set, that set may be assumed. If, however, there are multiple predefined parameter sets, the D2D manager 320 may determine the appropriate set to use based on an indication that may be included in the CQI request. For example, the SRS parameter set may be indicated by a field in the DCI (e.g., the TPC field).

The CQI request may additionally include an indication of a timing advance (TA) difference. Depending on the embodiment, the same field (e.g., the TPC field) of the DCI may be used to indicate both the SRS parameter set and TA difference. For example:

When only one D2D SRS parameter set is predefined, TPC field may be seen as indication of TA difference;

When two D2D SRS parameter sets are predefined, 1 bit of TPC may be seen as indication of SRS parameter set selection and another bit may be seen as indication of TA difference;

When more than 2 SRS parameter sets configured, TPC may be seen as an indication of SRS parameter set selection. Either no TA difference may be assumed or TA difference may be indicated in another field.

The D2D manager 320 associated with device 2 may monitor the SRS transmission without knowing that device 1 sent the SRS. The D2D manager 320 may perform measurements of the SRS transmission, which may be based on the TA difference and/or the appropriate D2D SRS parameter set, to determine the D2D CQI. As illustrated in operation 414, device 2 may report the determined D2D CQI to the eNB 402.

Although not illustrated in FIG. 4, the eNB 402 may also request a normal DL CQI from device 2 if periodic DL CQI had not been configured for device 2. The D2D controller 220 associated with the eNB 402 may consider one or more factors to make a mode selection, These factors may include, for example, one or more of the link quality between device 1 and the eNB (may be by eNB based on SRS transmitted by device 1), link quality between device 2 and eNB (may be obtained by eNB based on a DL CQI report from device 2), and the link quality between device 1 and device 2 (may be obtained from the D2D CQI report sent by device 2). The D2D controller 220 may determine based on the factors whether to cause establishment of a D2D link between device 1 and device 2 or to cause service for communication between device 1 and device 2 to be provided via network mode.

Some example embodiments may further facilitate signaling for measurement and report to facilitate link adaptation of a D2D link. In this regard, some example embodiments may configure an identifier and search space to facilitate the transmission and receipt of control signaling for a D2D cluster. The identifier and/or search space may, for example, be configured via higher layer signaling concurrent with or following D2D set up. In this regard, the identifier and/or search space may be configured via higher layer signaling that may be performed semi-statically for Radio Resource Control (RRC) configuration on a Control Plane (CP) in the cellular network.

More particularly, in some example embodiments, the D2D controller 220 may be configured to configure a D2D identifier specific to a D2D cluster. As an example, the D2D identifier may comprise a radio network temporary identifier (RNTI) specific to the D2D cluster. However, it will be appreciated that examples described herein with respect to use of a D2D specific RNTI are provided by way of example and not by way of limitation. As such, it will be appreciated that other types of identifiers may be substituted for an RNTI within the scope of the disclosure.

Further, in some example embodiments, the D2D controller 220 may configure a common search space specific to a D2D cluster. Configuration of such D2D search space may enable a D2D manager 320 associated with a UE 104 in a D2D cluster to find and identify D2D control signaling. In LTE/LTE-A systems, the introduced D2D cluster specific common search space may advantageously enable re-interpretation of the existing DCI format by UEs 104 engaged in D2D operation for use in D2D control signaling.

In some example embodiments, the D2D controller 220 may only configure/trigger reference signal signaling (e.g., SRS) for a UE 104 in a D2D cluster that is designated as the cluster head. The D2D controller 220 may configure the SRS for the cluster head periodically, or trigger SRS aperiodically. The D2D controller 220 may cause the access point 102 to send the SRS configuration/triggering signaling in the D2D cluster specific common search space, which may be monitored by all UEs 104 in the D2D cluster. Further, the signaling may be at least partially scrambled with the D2D cluster specific identifier.

When a D2D manager 320 associated with the cluster head detects an SRS configuration or trigger, the D2D manager 320 may cause the cluster head to transmit an SRS. The other UE(s) 104 in the D2D cluster may monitor the SRS transmission and respond appropriately with a CQI report based on measurement of the SRS. Accordingly, configuration of multiple SRSs may be avoided and the detection complexity for UEs 104 in a D2D cluster may be reduced.

In addition to SRS configuration/trigger for D2D purpose, some example embodiments also support SRS configuration/trigger for network (e.g., LTE/LTE-A network) use. Such SRS configuration/trigger may be sent with UE-specific signaling, such as in a search space specific to a UE and/or may be scrambled with a UE-specific RNTI.

D2D Periodic CQI for each UE 104 in a D2D cluster may also be configured, and may co-exist with normal cellular DL CQI. Periodic CQI configuration may be done by the access point 102 or by the LIE 104 serving as cluster head in a D2D cluster. A D2D manager 320 may generate a D2D CQI report based on SRS measurement in a reference UL subframe or a predefined/reserved resource. The CQI report format may be the same as the CQI report format used for cellular network reporting, or may be a format unique to reporting the D2D link quality.

Aperiodic D2D channel quality reporting may be triggered in multiple ways. By way of example, a first method of triggering aperiodic D2D CQI reporting may comprise the D2D controller 220 associated with an access point 102 sending an aperiodic CQI request in a search space specific to a D2D cluster. The DCI of the request may be scrambled with a RNTI specific to the UEs 104 in the D2D cluster/pair and the CQI request may be set to a predefined value (e.g., "1"). A D2D manager 320 associated with a UE 104 receiving the request may responsively generate a CQI report based on the reference SRS transmission, which may comprise the most recent periodic/aperiodic SRS transmission from the cluster head. The D2D manager 320 may send the CQI report in the resource indicated by the DCI of the request and an offset configured by the access point 102, which may be used to multiplex CQI reports from multiple UEs 104 in the same Physical Resource Blocks (PRBs).

By way of further example, a second method of triggering aperiodic D2D CQI reporting may comprise the D2D controller 220 associated with an access point 102 sending an aperiodic CQI request in a UE-specific search space. In this method, an extended CQI request may be used, which may include an indication of whether the request is for DL or not. Such indication may, for example, include an additional bit. If the CQI request is not for the DL, then a UE 104 receiving the request may know that it is a D2D CQI request.

By way of yet a further example, a third method of triggering aperiodic D2D CQI reporting may comprise the D2D manager 320 associated with a cluster head sending a CQI request in a resource allocated for D2D communication. The request may use a UE-specific RNTI to indicate which UE 104 in the D2D cluster should send a CQI report. For example, a normal 1-bit CQI request may be sent by the cluster head.

In some example embodiments, a D2D manager 320 associated with a UE 104 receiving a scheduling grant may interpret the scheduling grant based at least in part on some combination of the search space in which the scheduling grant is sent, the RNTI with which a portion of the grant is scheduled, and the contents of the CQI request field. Some example interpretations may be as follows:

For scheduling grant from access point, if detected in D2D specific search space, scrambled by D2D-RNTI and CQI-request=0, then the scheduling grant is interpreted as being for cluster head data transmission;

For scheduling grant from access point, if detected in D2D specific search space, scrambled by D2D-RNTI and CQI-request=1, then the scheduling grant is interpreted as being for aperiodic CQI request for UE(s) in the D2D cluster other than the cluster head;

For scheduling grant from access point, if detected in D2D specific search space, scrambled by UE specific RNTI, then the scheduling grant is interpreted as being for scheduling of cooperative retransmission from the receiving UE (e.g., the UE identified by the UE specific RNTI with which the scheduling grant is scrambled);

For scheduling grant from the cluster head, if scrambled by D2D RNTI and no CQI request enabled, the scheduling grant is interpreted as being for scheduling grant of data transmission from the cluster head;

For scheduling grant from cluster head, if scrambled by D2D RNTI and CQI request enabled, the scheduling grant is interpreted as being a CQI request for UE(s) in the D2D cluster other than the cluster head;

For scheduling grant from cluster head, if scrambled by UE specific RNTI and CQI request=0, then the scheduling grant is interpreted as being for scheduling of cooperative retransmission from the receiving UE (e.g., the UE identified by the UE specific RNTI with which the scheduling grant is scrambled); and For scheduling grant from cluster head, if scrambled by UE specific RNTI and CQI request=1, then the scheduling grant is interpreted as being for CQI request from the receiving UE (e.g., the UE identified by the UE specific RNTI with which the scheduling grant is scrambled).

Referring now to FIG. 5, FIG. 5 illustrates an example signaling diagram of signals that may be exchanged to facilitate D2D communication in accordance with some example embodiments. In this regard, FIG. 5 illustrates signaling that may occur between an evolved Node B (eNB) 502, a device 504, referred to in this example as "device 1," a device 506, referred to in this example as "device 2," and a device 508 referred to in this example as "device 3." The eNB 502 may comprise an embodiment of the access point 102. Devices 1-3 may each respectively comprise an embodiment of the UE 104 and may comprise a D2D cluster. Device 1 may be configured as the cluster head for the D2D cluster.

Device 1 may want to send data to device 2 and device 3. The eNB 502 may control the data transmission in this cluster and may configure one D2D cluster RNTI and one D2D cluster search space. The cluster search space may overlap with that of device 1's UE specific search space.

At operation 510, the D2D controller 220 associated with the eNB 502 may send an SRS configuration for device 1. The signaling may be scrambled with the cluster RNTI. All three devices may detect the corresponding Physical Downlink Control Channel (PDCCH) and Physical Downlink Shared Channel (PDSCH), but the D2D managers 320 associated with device 2 and device 3 may recognize that the SRS configuration is for device 1, since in the example illustrated in FIG. 5, only the cluster head is configured SRS. At operation 514, the D2D manager 320 associated with device 1 may cause SRS transmission in response to the configuration, and the D2D managers 320 associated with device 2 and 3 may monitor SRS transmission in the indicated resource.

At operation 512, the D2D controller 220 associated with the eNB 502 may configure D2D periodic CQI for each of device 2 and device 3. At operations 516 and 518, the D2D managers 320 for device 2 and device 3, respectively, may generate the CQI based on SRS measurement and send the generated CQI to the eNB 502. Since the SRS is not sent in such a band as wide as DL CRS, the D2D CQI report format can be different from that of the normal DL CQI used in LTE systems. For example, the D2D CQI report format may comprise a fixed 4-bit CQI for the whole D2D SRS bands configured for device 1.

Based on the D2D CQI reports, the D2D controller 220 associated with the eNB 502 may, at operation 520, send a scheduling grant for device 1 in the defined D2D common search space. The scheduling grant may be scrambled with the defined D2D RNTI so that all 3 devices can detect the grant. Devices 2 and 3 know that the grant is for device 1 and their respective associated D2D managers 320 may monitor in the assigned resource. The D2D managers 320 associated with devices 2 and 3 may send acknowledgement (ACK) or non-acknowledgement (NACK) messages in the configured physical uplink control channel (PUCCH) resource to the eNB 502 after detection of the data transmission by device 1, at operation 522. In the example of FIG. 5, device 2 may send an ACK message, at operation 524, and device 3 may send a NACK message, at operation 526. When the D2D controller 220 associated with the eNB 102 determines that device 2 sent an ACK and device 3 sent a NACK, it can request device 2 to cooperate with device 1 on retransmission of the data. This cooperation may be realized by sending a scheduling grant to device 2 with device 2's RNTI in the D2D common search space, as illustrated by operation 528 wherein both Device 1 and Device 2 are sent a scheduling grant. The D2D manager 320 associated with device 2 may interpret the scheduling grant based on the search space and the RNTI. While the scheduling grant with D2D RNTI for retransmission from device 1, previously sent in operation 520 is resent in operation 528, device 2 may ignore the retransmission off the scheduling grant since D2D already sent an ACK for the data transmission. The D2D manager 320 associated with device may only detect the retransmission grant from device 1 (operation 530) in the assigned resource, but in fact may receive the combined data transmission from both device 1 (retransmission at operation 530) and device 2 (cooperative retransmission at operation 532) to device 3 in co-operative manner. This cooperative retransmission may provide more diversity gain to improve the receiving performance.

In the example of FIG. 5, the CQI reports from devices 2 and 3 may also be triggered by CQI-request, either in D2D common search space or in UE-specific search space. If the CQI-request is sent in D2D common search space, CQI from both device 2 and 3 may be requested with one DCI. The resource allocation field in this DCI may indicate the resource to be shared by device 2 and 3 for CQI reporting. The multiplexing of the multiple CQI report may be pre-configured by eNB 502, such as through frequency division multiplexing (FDM) or code division multiplexing (CDM).

Referring now to FIG. 6, FIG. 6 illustrates an example signaling diagram of signals that may be exchanged to facilitate D2D communication in accordance with some example embodiments. In this regard, FIG. 6 illustrates signaling that may occur between an evolved Node B (eNB) 602, a device 604, referred to in this example as "device 1," a device 606, referred to in this example as "device 2," and a device 608 referred to in this example as "device 3." The eNB 602 may comprise an embodiment of the access point 102. Devices 1-3 may each respectively comprise an embodiment of the UE 104 and may comprise a D2D cluster. Device 1 may be configured as the cluster head for the D2D cluster.

Device 1 may want send data to device 2 and device 3. A single D2D cluster specific RNTI and search space may be configured. In the example of FIG. 6, the cluster head may control data transmission in the cluster in a resource that may be allocated by the eNB 602 semi-statically. While scheduling may be done by the cluster head, the SRS may still be configured by the eNB 602. Since the eNB 602 may have the information of the other UEs' SRS configuration, the eNB 602 may have the capability to assign an orthogonal resource for a device's SRS transmission to improve the performance, while the cluster head may not be able to guarantee assignment of an orthogonal resource unless the eNB 602 assigned a dedicated resource for D2D communication.

At operation 610, the eNB 602 may configure SRS as in the example of FIG. 5. In this regard, the eNB 602 may send an SRS configuration for device 1 via signaling scrambled with the D2D cluster RNTI in the common search space. All 3 devices may detect the corresponding PDCCH and PDSCH, but both device 2 and device 3 know that the configuration is for device 1 since only the cluster head is configured SRS in the example of FIG. 6. The D2D managers 320 associated with devices 2 and 3 may monitor the SRS, which may be transmitted by device 1 in operation 612, in the indicated resource.

The D2D manager 320 associated with the cluster head may configure the CQI for devices 2 and 3, since in this example, the cluster head acts as scheduler and may need to know the CQI values. As such, in operation 614 the cluster head may transmit a CQI request to devices 2 and 4, such as via higher layer signaling. In the example of FIG. 6, separate requests may be sent to each of devices 2 and 3. At operations 616 and 618, the D2D managers 320 associated with device 2 and device 3, respectively, may report CQI on the basis of measurement of the SRS transmitted in operation 612. As discussed with respect to the example of FIG. 5, since the SRS is not sent in as wide of a band as the DL CRS, the D2D CQI report format may be different from that of the normal DL CQI in LTE systems. For example, the D2D CQI report format may be fixed 4-bits CQI for the whole D2D SRS bands configured for device 1. Based on CQI reports by device 2 and 3, the D2D manager 320 associated with the cluster head send a scheduling grant (operation 620) and data transmission (operation 622) in the resource for D2D communication assigned by the eNB 602. The scheduling grant and data transmission may be scrambled with the D2D specific RNTI so that they are detectable by both device 2 and device 3. In the example of FIG. 6, device 2 may transmit an ACK, at operation 624, and device 3 may transmit a NACK, at operation 626. The ACK/NACK resource for device 2 and 3 may be configured by the cluster head. If the cluster head wants to trigger cooperative retransmission from device 2 in response to the NACK transmitted by device 3, the D2D manager 320 associated with the cluster head may send a scheduling grant to device 2 scrambled with that device's specific RNTI (operation 630). Accordingly, the cluster head may retransmit the data to device 3, at operation 632, in conjunction with device 2, which may cooperatively retransmit the data, at operation 634.

In the examples of FIGS. 5 and 6, in order to avoid UL reception window mismatch between device 1 transmitting the SRS and receiving devices 2 and 3 measuring the SRS from device 1 (such as due to different distances of devices 1, 2, and 3 to the eNB), the UL timing difference (dTA=TA1−TAi) may be signalled via some bit in a field in a re-interpreted DCI format (e.g., TPC field). These bits may indicate the UL timing difference in signed TA resolution units, Tau. For example, a 3 bit field may yield the following example timing advance difference indications:

000 −3*Tau
    001 −2*Tau
    010 −1*Tau
    011 0
    100 +1*Tau
    101 +2*Tau
    110 +3*Tau
    111 spare As will be appreciated, such a three bit field may allow indication of an UL timing difference up to +/−3*Tau between device 1 and, for example, device 2. An additional 3 bits may be needed to indicate an UL timing difference between device 1 and device 3 (or 6 bits in total). This may ensure more optimised SRS detection by measuring devices 2 and 3 in case dTA is not equal to zero, which may, for example, be a problem for a D2D range is greater than 80 meters, which corresponds to half the TA resolution of 16×Ts=0.48 microseconds. Using an example D2D range of 300 m, the mismatch may be about 2 microseconds, or half a cyclic prefix (CP) length.

Referring now to FIG. 7, FIG. 7 illustrates a flowchart according to an example method for facilitating device-to-device communication setup according to some example embodiments. In this regard, FIG. 7 illustrates operations that may be performed at the access point 102. The operations illustrated in and described with respect to FIG. 7 may, for example, be performed by, with the assistance of, and/or under the control of one or more of the processing circuitry 210, processor 212, memory 214, communication interface 218, or D2D controller 220. Operation 700 may comprise causing a message to be sent to a first device to trigger the first device to transmit a reference signal. The processing circuitry 210, processor 212, memory 214, communication interface 218, and/or D2D controller 220 may, for example, provide means for performing operation 700. Operation 710 may comprise causing a request for a channel quality indication to be sent to a second device. The request may indicate that the channel quality indication is to be based on measurement of the reference signal. The processing circuitry 210, processor 212, memory 214, communication interface 218, and/or D2D controller 220 may, for example, provide means for performing operation 710. Operation 720 may comprise receiving the channel quality indication in response to the request, the channel quality indication being indicative of a link quality between the first device and the second device. The processing circuitry 210, processor 212, memory 214, communication interface 218, and/or D2D controller 220 may, for example, provide means for performing operation 720. Operation 730 may comprise determining based at least in part on the received channel quality indication whether to cause establishment of a D2D link between the first device and the second device or to cause service for communication between the first device and the second device to be provided via a network mode. The processing circuitry 210, processor 212, memory 214, and/or D2D controller 220 may, for example, provide means for performing operation 730.

FIG. 8 illustrates a flowchart according to an example method for facilitating device-to-device communication setup according to some example embodiments. In this regard, FIG. 8 that may be performed at a UE 104. The operations illustrated in and described with respect to FIG. 8 may, for example, be performed by, with the assistance of, and/or under the control of one or more of the processing circuitry 310, processor 312, memory 314, communication interface 318, user interface 316, or D2D manager 320. Operation 800 may comprise receiving, at a first device, a request for a channel quality indication sent by a network access point. The request may indicate that the channel quality indication is to be based on measurement of a reference, The processing circuitry 310, processor 312, memory 314, communication interface 318, and/or D2D manager 320 may, for example, provide means for performing operation 800. Operation 810 may comprise receiving, at the first device, the reference signal. The reference signal may be transmitted by a second device. While operation 810 is illustrated as occurring following operation 800, it will be appreciated that the order of operations 800 and 810 is not limited to the illustrated ordering, and the reference signal may be received prior to the request for a channel quality indication. The processing circuitry 310, processor 312, memory 314, communication interface 318, and/or D2D manager 320 may, for example, provide means for performing operation 810. Operation 820 may comprise performing a measurement to determine the channel quality indication based at least in part on the reference signal in response to the request. The channel quality indication may be indicative of a link quality between the first device and the second device. The processing circuitry 310, processor 312, memory 314, and/or D2D manager 320 may, for example, provide means for performing operation 820. Operation 830 may comprise causing the determined channel quality indication to be sent from the first device to the network access point. The processing circuitry 310, processor 312, memory 314, communication interface 318, and/or D2D manager 320 may, for example, provide means for performing operation 830.

Referring now to FIG. 9, FIG. 9 illustrates a flowchart according to an example method for facilitating device-to-device communication according to some example embodiments. The method illustrated in FIG. 9 may, for example, be performed on a D2D link setup in accordance with the method illustrated in FIG. 7 and/or the method illustrated in FIG. 8. FIG. 9 illustrates operations that may be performed at the access point 102. The operations illustrated in and described with respect to FIG. 9 may, for example, be performed by, with the assistance of, and/or under the control of one or more of the processing circuitry 210, processor 212, memory 214, communication interface 218, or D2D controller 220. Operation 900 may comprise configuring a D2D identifier specific to a D2D cluster comprising two or more devices. The processing circuitry 210, processor 212, memory 214, communication interface 218, and/or D2D controller 220 may, for example, provide means for performing operation 900. Operation 910 may comprise a D2D search space specific to the D2D cluster. The processing circuitry 210, processor 212, memory 214, communication interface 218, and/or D2D controller 220 may, for example, provide means for performing operation 910. Operation 920 may comprise D2D control signaling related to the D2D cluster to be sent in the D2D search space. At least a portion of the D2D control signaling may be scrambled with the D2D identifier. The processing circuitry 210, processor 212, memory 214, communication interface 218, and/or D2D controller 220 may, for example, provide means for performing operation 920.

FIG. 10 illustrates a flowchart according to another example method for facilitating device-to-device communication according to some example embodiments. The method illustrated in FIG. 10 may, for example, be performed on a D2D link setup in accordance with the method illustrated in FIG. 7 and/or the method illustrated in FIG. 8. FIG. 10 illustrates operations that may be performed at the UE 104. The operations illustrated in and described with respect to FIG. 9 may, for example, be performed by, with the assistance of, and/or under the control of one or more of the processing circuitry 310, processor 312, memory 314, communication interface 318, user interface 316, or D2D manager 320. Operation 1000 may comprise determining, at a first device, a configuration of a D2D identifier specific to a D2D cluster comprising the first device and at least one second device. The D2D identifier may, for example, be configured and signaled to the first device by a network access point. The processing circuitry 310, processor 312, memory 314, communication interface 318, and/or D2D manager 320 may, for example, provide means for performing operation 1000. Operation 1010 may comprise determining, at the first device, a configuration of a D2D search space specific to the D2D cluster. The search space may, for example, be configured and signaled to the first device by a network access point. The processing circuitry 310, processor 312, memory 314, communication interface 318, and/or D2D manager 320 may, for example, provide means for performing operation 1010. Operation 1020 may comprise receiving, at the first device, D2D control signaling related to the D2D cluster. The D2D control signaling may be sent in the D2D search space, and at least a portion of the D2D control signaling may be scrambled with the D2D identifier. The processing circuitry 310, processor 312, memory 314, communication interface 318, and/or D2D manager 320 may, for example, provide means for performing operation 1020.

FIGS. 7-10 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, implemented by an access point which provides wireless access to a cellular network, comprising:
    transmitting, by the access point, a message to a first mobile device to trigger the first mobile device to transmit a reference signal;
    transmitting, by the access point, a request for a channel quality indication to a second mobile device different from the first mobile device, the request indicating that the channel quality indication is to be based on measurement of the reference signal;
    receiving, by the access point, the channel quality indication in response to the request, the channel quality indication being indicative of a link quality between the first mobile device and the second mobile device; and
    determining, by the access point, based at least in part on the received channel quality indication whether to cause establishment of a device-to-device link between the first mobile device and the second mobile device or to cause service for communication between the first mobile device and the second mobile device to be provided via a network mode.

2. A non-transitory computer-readable storage medium having computer-executable program code instructions stored therein, the computer-executable program code instructions comprising program code instructions configured to perform a method according to claim 1.

3. An apparatus which acts as an access point that provides wireless access to a cellular network comprising:
    processing circuitry configured to at least:
        control transmission of a message a first mobile device to trigger the first mobile device to transmit a reference signal;
        control transmission of a request for a channel quality indication to a second mobile device different than the first mobile device, the request indicating that the channel quality indication is to be based on measurement of the reference signal;
        receive the channel quality indication in response to the request, the channel quality indication being indicative of a link quality between the first device and the second mobile device; and
        determine based at least in part on the received channel quality indication whether to cause establishment of a device-to-device link between the first mobile device and the second mobile device or to cause service for communication between the first mobile device and the second mobile device to be provided via a network mode.

4. The apparatus of claim 3, wherein the request for the channel quality indication comprises a channel quality indicator (CQI) request including a parameter indicating that the request is for an uplink subframe rather than a downlink subframe, and wherein the received channel quality indication comprises a channel quality indicator.

5. The apparatus of claim 3, wherein the channel quality indication comprises an aperiodic channel quality indication for an uplink subframe.

6. The apparatus of claim 3, wherein the channel quality indication comprises a periodic channel quality indication for an uplink subframe.

7. The apparatus of claim 3, wherein the reference signal comprises a sounding reference signal (SRS).

8. The apparatus of claim 3, wherein the reference signal includes a predefined device-to-device reference signal parameter set.

9. The apparatus of any of claim 3, wherein the request for the channel quality indication comprises an indication of a timing advance difference between the first mobile device and the second mobile device.

10. The apparatus of claim 3, wherein the processing circuitry is further configured to:
    receive a first downlink channel quality indication from the first mobile device and a second downlink channel quality indication from the second mobile device; and
    determine whether to cause establishment of a device-to-device link between the first mobile device and the second mobile device or to cause service for communication between the first mobile device and the second mobile device to be provided via a network mode further based on the first and second downlink channel quality indications.

11. A method comprising:
    receiving, at a first mobile device, a request for a channel quality indication sent by a network access point that provides wireless access to a cellular network, the request indicating that the channel quality indication is to be based on measurement of a reference signal;
    receiving, at the first mobile device, the reference signal, the reference signal being transmitted by a second mobile device that is different than the first mobile device, the second mobile device being triggered to transmit the reference signal in response to a request from the network access point;
    performing, at the first mobile device, a measurement to determine the channel quality indication based at least in part on the reference signal in response to the request, wherein the channel quality indication is indicative of a link quality between the first mobile device and the second mobile device; and
    transmitting the determined channel quality indication from the first mobile device to the network access point.

12. A non-transitory computer-readable storage medium having computer-executable program code instructions stored therein, the computer-executable program code instructions comprising program code instructions configured to perform a method according to claim 11.

13. A mobile device comprising:
processing circuitry configured to at least:
receive a request for a channel quality indication sent by a network access point that provides wireless access to a cellular network, the request indicating that the channel quality indication is to be based on measurement of a reference signal;
receive the reference signal, the reference signal being transmitted by a second mobile device, the second mobile device being triggered to transmit the reference signal in response to a request from the network access point;
perform a measurement to determine the channel quality indication based at least in part on the reference signal in response to the request, wherein the channel quality indication is indicative of a link quality between the apparatus and the second mobile device; and
control transmission of the determined channel quality indication to the network access point.

14. The apparatus of claim 13, wherein the request for the channel quality indication comprises a channel quality indicator (CQI) request including a parameter indicating that the request is for an uplink subframe rather than a downlink subframe, and wherein the determined channel quality indication comprises a channel quality indicator.

15. The apparatus of claim 13, wherein the determined channel quality indication comprises an aperiodic channel quality indication for an uplink subframe.

16. The apparatus of claim 13, wherein the channel quality indication comprises a periodic quality indication for an uplink subframe.

17. The apparatus of claim 13, wherein the reference signal comprises a sounding reference signal (SRS).

18. The apparatus of claim 13, wherein the reference signal includes a predefined device-to-device reference signal parameter set, and wherein the processing circuitry is configured to perform the measurement based at least in part on the predefined device-to-device reference signal parameter set.

19. The apparatus of claim 13, wherein the request for the channel quality indication comprises an indication of a timing advance difference between the first mobile device and the second mobile device, and wherein the processing circuitry is configured to perform the measurement based at least in part on the timing advance difference.

* * * * *